(No Model.) 2 Sheets—Sheet 1.

J. D. RUSH.
CHAMBER OR OTHER LIQUID RECEIVING VESSEL.

No. 515,131. Patented Feb. 20, 1894.

Witnesses,
J. H. Nurse
J. A. Bayless

Inventor
Jacob D. Rush
B. Dewey & Co.
Attys (No Model.) 2 Sheets—Sheet 2.

J. D. RUSH.
CHAMBER OR OTHER LIQUID RECEIVING VESSEL.

No. 515,131. Patented Feb. 20, 1894.

Witnesses,

Inventor,
Jacob D. Rush
By Dewey & Co.
Attys

UNITED STATES PATENT OFFICE.

JACOB D. RUSH, OF SAN DIEGO, CALIFORNIA.

CHAMBER OR OTHER LIQUID-RECEIVING VESSEL.

SPECIFICATION forming part of Letters Patent No. 515,131, dated February 20, 1894.

Application filed June 16, 1893. Serial No. 477,856. (No model.)

*To all whom it may concern:*

Be it known that I, JACOB D. RUSH, a citizen of the United States, residing in San Diego, San Diego county, State of California, have invented an Improvement in Chambers or other Liquid-Receiving Vessels; and I hereby declare the following to be a full, clear, and exact description of the same.

My invention relates to the general class of liquid receiving vessels, and especially to the class of chamber vessels and urinals.

It consists essentially in a vessel of suitable shape and capacity having within it, at a short distance below its top, a receiving plate, disposed at an inclination, and provided with an opening at one side or edge in close proximity to the adjacent wall of the vessel, and communicating with the space below.

It also consists in the novel constructions and arrangements which I shall hereinafter fully describe and specifically claim.

The objects of my invention are to prevent the noise of falling water, and to conceal the contents, thus providing what may be termed a "noiseless and blind" urinal or chamber vessel.

Figure 1:
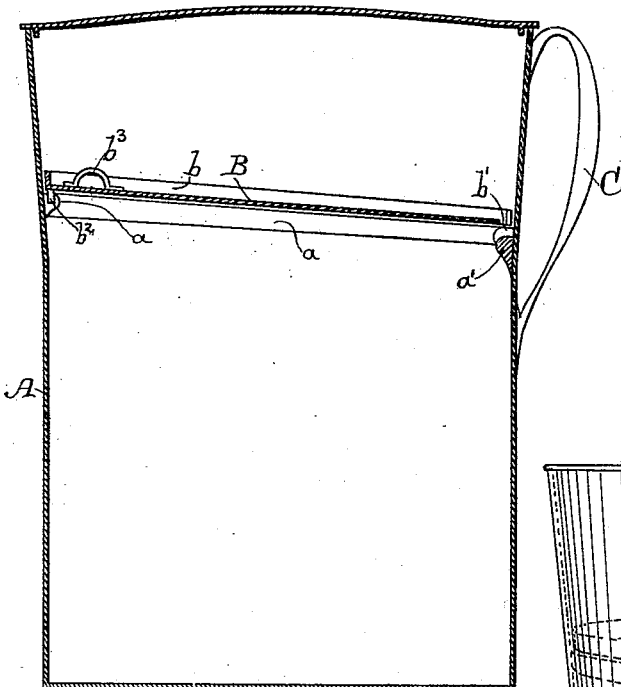
Figure 3:
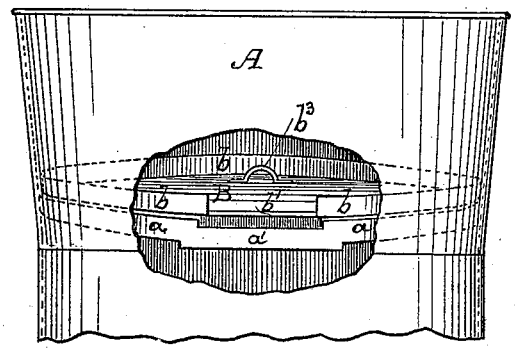
Figure 2:
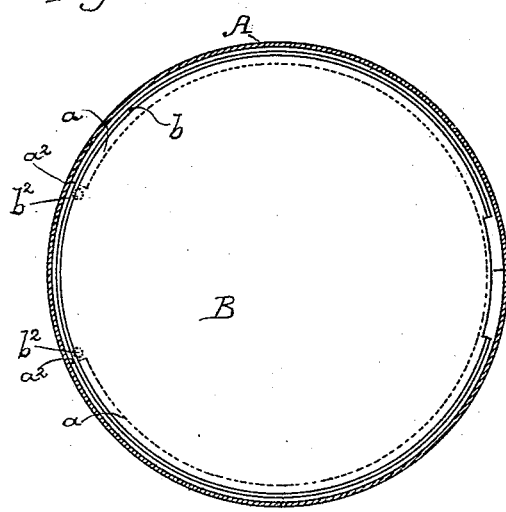
Figure 4:
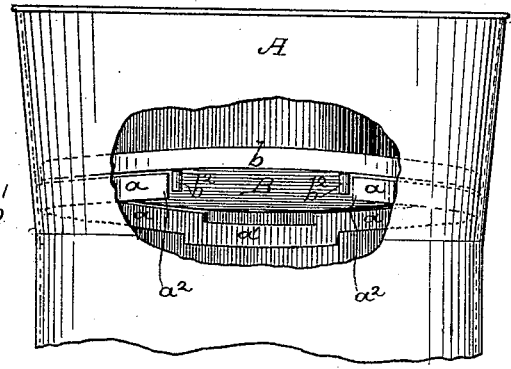
Figure 5:
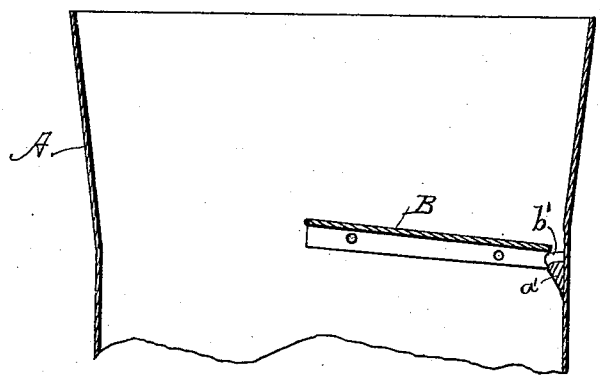

Referring to the accompanying drawings for a more complete explanation of my invention,—Figure 1 is a vertical section of the vessel. Fig. 2 is a plan, the outside lid or cover being removed. Fig. 3 is a view from the lower edge of the inclined receiving plate, a portion of the vessel being broken away to show the interior parts. Fig. 4 is a similar view from the upper edge of the inclined receiving plate. Fig. 5 is a section, and Fig. 6 a plan showing the receiving plate as half the size of the vessel.

A is a vessel having a suitable general shape and capacity. Its upper portion may be made slightly flaring, to admit readily the receiving plate B. This plate is fitted to the vessel A at an inclination, its higher edge being but little below the top. It has an encircling rim $b$, which has its lower side cut away, as is also the edge of the plate leaving a small recess or opening at $b'$. At its upper edge, the plate has two small lugs $b^2$ and a suitable handle $b^3$, by which it may be removed and replaced.

Within vessel A is a ledge $a$, of the inclination which the plate B, which rests upon it, is to have. At the lower side, this ledge, directly under the recess $b'$ of plate B, is depressed, and is there formed into an inwardly projecting half-round or curved faced flange $a'$, a little longer and a little wider than the recess $b'$ above it, so that the water will fall directly and gently upon it and be, by it, directed noiselessly down the side of the vessel. At its upper side, the ledge $a$ is cut away between the points $a^2$—$a^3$, and against the ends of this cut away portion, the lugs $b^2$ of plate B bear, to hold said plate in position. Water falling but a short distance and without noise upon the inclined receiving plate B, will be by it confined by its rim $b$ and conducted downwardly to the opening $b'$. Through this it will pass and falling upon the curved faced flange $a'$ will flow down noiselessly along the wall of the vessel, into the space below the receiving plate, in which it will be out of sight.

The plate B may be readily removed and replaced, and when removed, the contents of the vessel may be discharged freely and without obstruction through the cut away portion $a^2$—$a^2$ of the ledge $a$, said portion being opposite the handle C, for convenience of manipulation.

Figure 6:
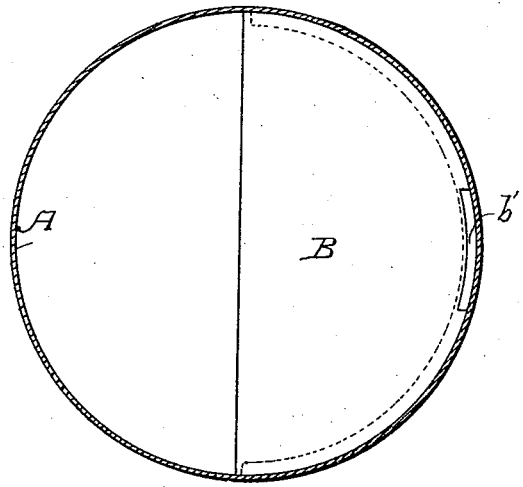

Although I have heretofore described the receiving plate B as being a removable one, it is obvious that it may, as I have shown in Figs. 5 and 6 be permanently secured to the vessel, and although I have shown it as practically commensurate in area with the interior of the vessel, it need not be so, for as I have shown in said Figs. 5 and 6 it may be smaller. This receiving plate, it may also be stated, may be used in connection with any vessel into which it is desirable to conduct any liquid noiselessly.

The ordinary cover may or may not be provided for the vessel A.

Having thus described my invention, what I claim as new, and desire to secure by Letters Patent, is—

1. In chambers and other liquid receiving vessels the vessel having an inclined ledge below its top, an inclined receiving plate supported upon said ledge having an encircling rim to confine and direct the liquid and an opening in its lower side in close proximity to the adjacent wall of the vessel, and a flange projecting from said wall directly under the opening whereby the liquid passing through is directed to and flows down upon the side of the vessel, substantially as herein described.

2. In chambers and other liquid receiving vessels, an inclined receiving plate therein having an opening at its lower side in close proximity to the adjacent wall of the vessel, and an inclined ledge within the vessel upon which the plate rests, said ledge having a depressed flange directly under the opening in the receiving plate whereby the liquid passing through said opening is directed to and flows down upon the side of the vessel, substantially as herein described.

3. In chambers and other liquid receiving vessels, an inclined receiving plate therein having an opening in its lower side in close proximity to the adjacent wall of the vessel and lugs upon its opposite side, and a ledge within the vessel upon which the plate rests, said ledge being cut out on one side to receive the engagement of the lugs of the plate, and having a depressed flange at its lower side directly under the opening in the receiving plate whereby the liquid passing through said opening is directed to and flows down upon the side of the vessel, substantially as herein described.

In witness whereof I have hereunto set my hand.

JACOB D. RUSH.

Witnesses:
F. E. VAN HOUTEN,
H. M. JACOBY.